United States Patent Office 3,063,831
Patented Nov. 13, 1962

3,063,831
METHOD OF MAKING TITANIUM-CONTAINING ALLOYS
Harold R. Grady, New Concord, Ohio, assignor to Vanadium Corporation of America, New York, N.Y., a corporation of Delaware
No Drawing. Filed Jan. 18, 1961, Ser. No. 83,374
8 Claims. (Cl. 75—129)

This invention relates to a method of making titanium-containing alloys.

The present application is a continuation-in-part of my application Serial No. 802,634, filed March 30, 1959, now abandoned.

Ferrotitanium is now commonly made by melting a charge of titanium ore such as ilmenite, steel scrap, carbon and fluxing agents in an electric furnace. The carbon reduces the titanium dioxide in the ilmenite and the titanium combines with the steel to form ferrotitanium. Titanium is a very refractory metal and, where the ferrotitanium contains about 10% or more titanium, it is difficult to remove the ferrotitanium from the electric furnace because the ferrotitanium is so viscous that it does not pour readily.

In recent years, it has become possible to obtain titanium scrap of substantially pure titanium metal. This titanium scrap usually contains about 85 to 95% or more titanium, the balance being frequently aluminum and vanadium. A typical titanium scrap may contain about 90% titanium, 6% aluminum, and 4% vanadium. It was attempted to utilize such titanium scrap by melting in an electric furnace a charge of such titanium scrap, steel scrap, and carbon, but it was found that this method led to the same difficulties of removal of the resultant ferrotitanium from the furnace that has been encountered in employing a furnace charge of ilmenite, steel scrap and carbon. Alloys produced by either of these methods are extremely viscous and difficult to remove from the furnace.

In accordance with the present invention, ferrotitanium containing about 10 to 30% titanium, or silicon-base alloy containing about 7 to 30% titanium, can be produced without forming molten ferrotitanium or titanium-containing silicon-base alloy in a furnace, thereby avoiding the necessity of removing the extremely viscous ferrotitanium or titanium-containing silicon-base alloy from a furnace. In carrying out the present invention, a charge of titanium scrap is placed in a refractory-lined ladle or in a refractory mold and molten diluent metal is poured at a temperature above about 2800° F. onto the charge in the ladle or mold. The diluent metal is selected from the class consisting of iron and silicon, as herein defined. The term "iron," as used herein, means pig iron, steel, or iron of any carbon content, or any combination thereof. The term "silicon," as used herein, means silicon metal, ferrosilicon, or silicon-base alloy with or without calcium, aluminum, vanadium. The molten diluent metal and the titanium scrap are so proportioned that the scrap is melted and a homogeneous body of titanium-containing alloy is produced in the ladle or mold. The ratio, by weight, of molten diluent metal to scrap is, in some instances, preferably about 3 to 1, but may vary between about 2 to 1 and about 9 to 1, or even between about 2 to 1 and 12 to 1. If the homogeneous body of titanium-containing alloy is produced in a ladle, it is then teemed into a mold. The titanium-containing alloy is subsequently cooled in the mold until it has solidified and is then removed from the mold and crushed to the desired size. The following examples will further illustrate the invention, Examples 1-8 referring to iron-base titanium-containing alloys and Examples 9 and 10 to silicon-base titanium-containing alloys.

The iron base furnace charges were melted in a three-phase arc melting steel refining type furnace and consisted of pig iron or pig iron and heavy scrap or heavy scrap alone. The special quality heavy scrap designated as "Armco" was often used. In some cases, metallurgical coke formed a part of the furnace charge.

The silicon-base alloys were produced in an open-top, carbon-lined smelting-type furnace. The charge consisted of silica rock, limestone, scrap, coke and coal.

The mold, which in Examples 1-8, contained the charge of titanium scrap, was saucer-shaped, having a diameter of 72 inches at the bottom, a diameter of 82 inches at the top, and was 8 inches deep. It was lined with either high-alumina plastic fire clay or with $CO_2$-set silica sand.

Metal temperatures were determined by a precious metal, immersion thermocouple to obtain readings within the furnace and by an optical pyrometer to obtain tapping and teeming temperatures.

The pig iron employed had the following analysis:

| | Percent |
|---|---|
| C | 4.39 |
| Si | 0.77 |
| Mn | 0.78 |
| P | 0.04 |
| S | 0.026 |
| Ti | 0.030 |
| V | 0.024 |
| Fe | Balance |

The "Armco" heavy scrap consisted of heavy steel punchings. The "Armco" steel is a low-carbon steel containing less than 0.10% carbon. In some cases, the furnace charge also contained metallurgical coke in order to adjust the carbon content of the molten iron. In some of the tests, the furnace charge also contained pebble lime, fluorspar, or silica sand.

In the production of the silicon-base complex alloys containing titanium, the furnace charge was composed to produce a silicon-base alloy consisting essentially of about 45–60% silicon, 5–12% calcium, 0–2% aluminum, 0.15–0.7% carbon, balance iron and incidental impurities. On the basis of the tests performed with iron-base and silicon-base alloys, it would appear reasonable to assume that ferro-silicons or silicon-containing iron or steel, as well as silicon metal, can perform as molten diluent metal, absorbing solid titanium within the ranges of ratios indicated above. The titanium scrap in the mold or in the ladle consisted of titanium alloy which generally analyzed between 85 and 95% or more titanium and which also contained minor amounts of aluminum and vanadium. The titanium scrap was in the form of light turnings, light plate stampings of 3/16 inch maximum thickness and some heavier plate stampings up to 1/2 inch in thickness.

In operation, the molten iron or molten silicon-base alloy resulting from melting the charge in the furnace was tapped from the furnace into a bottom-pour ladle and then teemed from the ladle into the mold. In Examples 1–8, the molten iron was poured onto titanium scrap in the mold. In Examples 9 and 10, the molten silicon-base alloy was poured onto titanium scrap in the ladle. Irrespective of the type of molten diluent metal, the titanium scrap can be mixed with it either in the ladle or in the mold. Sometimes a mixture of titanium scrap and Cabot coke was used in the refractory-lined mold in order to adjust the carbon content in the product to the desired level. The Cabot coke is a coke having a low ash content.

All of the heats were tapped from the furnace at a temperature of 2950° F. The temperature at which the heats were teemed from the ladle into the mold was substantially the same, or perhaps 50° F. lower temperature than the tapping temperature.

The heat supplied by the molten diluent metal, together with the heat generated by the solution of titanium in iron and/or silicon and possibly by the formation of titanium carbides from the carbon contained in the molten diluent metal or admixed with the titanium scrap, was sufficient to keep the high melting ferrotitanium or titanium-containing silicon-base alloy reasonably fluid while the molten diluent metal and the titanium scrap were being mixed either in the ladle or in the mold. Mixing was facilitated by moving the nozzle stream of molten diluent metal during teeming from the ladle over the surface of the heaped-up titanium scrap in the mold and then by rabbling the titanium scrap with steel bars into the molten diluent metal. For easier breaking of the casts, the alloy produced was scored while mushy in the mold. Friability was developed by sprinkling water from a hose onto the alloy while at red heat. After quenching, the product was crushed to minus 1¼ inch size.

The pertinent data relating to Examples 1 to 10 are provided in Tables 1 and 2. Table 1 gives the furnace charges and the mold or ladle charges. Table 2 gives data on the titanium alloy products.

TABLE 1

| Example No. | Note | Furnace Charge, Pounds | | | | Mold or Ladle Charge, Pounds | | |
|---|---|---|---|---|---|---|---|---|
| | | Pig Iron | "Armco" Hvy. Scrap | Total Metal | Met. Coke | Ti Scrap | Cabot Coke |
| 1 | (a) | 1,505 | | 1,505 | 60 | 246.5 263 | |
| 2 | (b) | 440 | 1,060 | 1,500 | 60 | 500 | |
| 3 | (c) | 1,500 | | 1,500 | 60 | 500 | 60 |
| 4 | (d) | 440 | 1,060 | 1,532 | | 303 | |
| 5 | | 1,500 | | 1,500 | 60 | 375 | |
| 6 | (e) | 440 | 1,110 | 1,550 | | 375 | |
| 7 | | | 1,600 | 1,600 | | 400 | 80 |
| 8 | (f) | | 1,600 | 1,600 | | 400 | |
| 9 | (g) | | | 4,400 | | 500 | |
| 10 | (h) | | | 4,100 | | 410 | |

(a) In Example No. 1, the titanium scrap in the mold consisted of 263 pounds of stampings and 246.5 pounds of turnings. In all other examples, the titanium scrap consisted of stampings.
(b) In Example No. 2, the furnace charge also contained 30 pounds each of pebble lime, fluorspar, and silica sand for forming a slag cover in the furnace. The carbon-containing iron resulting from melting the charge in the furnace was lanced with one bottle of oxygen to bring the carbon content down to the desired level.
(c) In Example No. 3, the furnace charge also contained 15 pounds of silica sand.
(d) In Example No. 4, the furnace charge also contained 50 pounds of pebble lime and 15 pounds of fluorspar for slag cover, and the charge also contained 32 pounds of 22% FeSi.
(e) In Example No. 6, the furnace charge also contained 65 pounds of pebble lime and 20 pounds of fluorspar.
(f) In Example No. 8, automotive steel scrap was used as furnace charge, which also contained 20 to 30 pounds of lime as a flux.
(g) In Example No. 9, the silicon-base alloy analyzed 50.18% silicon, 6.80% calcium, 1.36% aluminum, 0.18% carbon, balance substantially iron and the titanium alloy scrap constituting the ladle charge was of the 6% aluminum, 4% vanadium type.
(h) In Example No. 10, the silicon-base alloy analyzed 55.22% silicon, 9.48% calcium, 1.03% aluminum, 0.61% carbon, balance substantially iron, and the titanium alloy scrap constituting the ladle charge was of the 6% aluminum, 4% vanadium type.

TABLE 2

Titanium Alloy Products

| Example No. | Pounds | Analysis (Percent) | |
|---|---|---|---|
| | | C | Ti |
| 1 | 2,010 | 3.38 | 23.64 |
| 2 | 1,820 | 1.17 | 25.56 |
| 3 | 1,940 | 4.93 | 21.66 |
| 4 | 1,815 | 1.07 | 15.00 |
| 5 | 1,780 | 3.25 | 18.18 |
| 6 | 1,915 | 1.05 | 16.38 |
| 7 | 1,900 | 3.45 | 20.32 |
| 8 | 1,755 | 0.45 | 19.60 |
| 9 | 4,260 | 48.92% Si, 6.64% Ca, 10.34% Ti, 1.38% Al, 0.12% C, 0.35% V, Bal. Fe. | |
| 10 | 4,410 | 50.44% Si, 8.32% Ca, 7.53% Ti, 1.46% Al, 0.15% C, 0.24% V, Bal. Fe. | |

The invention is not limited to the preferred embodiment, but may be otherwise embodied or practiced within the scope of the following claims.

I claim:
1. The method of making alloys containing, by weight, about 7 to 30% titanium, which comprises mixing, without supply of external heat, solid titanium scrap containing at least 85% titanium and molten diluent metal selected from the class consisting of molten iron and molten silicon, the molten diluent metal and the titanium scrap being in such proportions that the titanium scrap melts and forms homogeneous titanium alloy containing about 7 to 30% titanium, the heat supplied by the molten diluent metal, together with the heat generated by the solution of titanium in the diluent metal, being sufficient to keep the titanium alloy reasonably fluid while the molten diluent metal and titanium scrap are being mixed.

2. A method according to claim 1, wherein the weight ratio of molten diluent metal to titanium scrap is between about 2 to 1 and 12 to 1.

3. The method of making alloys containing, by weight, about 7 to 30% titanium, which comprises mixing in a mold, without supply of external heat, solid titanium scrap containing at least 85% titanium and molten diluent metal selected from the class consisting of molten iron and molten silicon, the molten diluent metal and the titanium scrap being in such proportions that the titanium scrap melts and forms homogeneous titanium alloy containing about 7 to 30% titanium, the heat supplied by the molten diluent metal, together with the heat generated by the solution of titanium in the diluent metal, being sufficient to keep the titanium alloy reasonably fluid while the molten diluent metal and titanium scrap are being mixed in the mold, cooling the titanium alloy in the mold to solidify it and removing it from the mold.

4. The method of making alloys containing, by weight, about 7 to 30% titanium, which comprises mixing in a ladle, without supply of external heat, solid titanium scrap containing at least 85% titanium and molten diluent metal selected from the class consisting of molten iron and molten silicon, the molten diluent metal and the titanium scrap being in such proportions that the titanium scrap melts and forms homogeneous titanium alloy containing about 7 to 30% titanium, the heat supplied by the molten diluent metal, together with the heat generated by the solution of titanium in the diluent metal, being sufficient to keep the titanium alloy reasonably fluid while the molten diluent metal and titanium scrap are being mixed in the ladle, teeming the titanium alloy from the ladle into a mold, cooling the titanium alloy in the mold to solidify it and removing it from the mold.

5. The method of making ferrotitanium containing, by weight, about 10 to 30% titanium, which comprises mixing, without supply of external heat, solid titanium scrap containing at least 85% titanium and molten iron, the molten iron and the titanium scrap being in such proportions that the titanium scrap melts and forms homogeneous ferrotitanium containing about 10 to 30% titanium, the heat supplied by the molten iron, together with the heat generated by the solution of titanium in iron, being sufficient to keep the ferrotitanium reasonably fluid while the molten iron and titanium scrap metal are being mixed.

6. The method of making alloys containing, by weight, about 7 to 30% titanium, which comprises mixing, without supply of external heat, solid titanium scrap containing at least 85% titanium and molten silicon, the molten silicon and titanium scrap being in such proportions that the titanium scrap melts and forms homogeneous titanium alloy containing about 7 to 30% titanium, the heat supplied by the molten silicon, together with the heat generated by the solution of titanium in silicon, being sufficient to keep the titanium alloy reasonably fluid while the molten silicon and titanium scrap are being mixed.

7. The method of making alloys containing, by weight, about 7 to 30% titanium, which comprises mixing in a mold, without supply of external heat, solid titanium scrap containing at least 85% titanium and molten silicon, the molten silicon and the titanium scrap being in such proportions that the titanium scrap melts and forms homogeneous titanium alloy containing about 7 to 30% titanium, the heat supplied by the molten silicon, together with the heat generated by the solution of titanium in silicon, being sufficient to keep the titanium alloy reasonably fluid while the molten silicon and titanium scrap are being mixed, cooling the titanium alloy in the mold to solidify it and removing it from the mold.

8. The method of making alloys containing, by weight, about 7 to 30% titanium, which comprises mixing, without supply of external heat, solid titanium scrap containing at least 85% titanium and molten silicon-base alloy consisting essentially of about 45–60% silicon, 5–12% calcium, 0–2% aluminum, 0.15–0.7% carbon, balance iron and incidental impurities, the molten silicon-base alloy and the titanium scrap being in such proportions that the titanium scrap melts and forms homogeneous titanium alloy containing about 7 to 30% titanium, the heat supplied by the molten silicon-base alloy, together with the heat generated by the solution of titanium in the silicon-base alloy, being sufficient to keep the titanium alloy reasonably fluid while the molten silicon-base alloy and titanium scrap are being mixed.

References Cited in the file of this patent

UNITED STATES PATENTS

| | | |
|---|---|---|
| 1,028,389 | Rossi | June 4, 1912 |
| 2,128,601 | Burden et al. | Aug. 30, 1938 |
| 2,296,938 | Lytle | Sept. 29, 1942 |
| 2,367,630 | Udy | Jan. 16, 1945 |
| 2,693,414 | Dunn et al. | Nov. 2, 1954 |
| 2,828,199 | Findlay | Mar. 25, 1958 |